(12) United States Patent
Gibbon et al.

(10) Patent No.: US 8,639,636 B2
(45) Date of Patent: Jan. 28, 2014

(54) SYSTEM AND METHOD FOR USER BEHAVIOR MODELING

(75) Inventors: David C. Gibbon, Lincroft, NJ (US);
Andrea Basso, Marlboro, NJ (US);
Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1098 days.

(21) Appl. No.: 12/192,748

(22) Filed: Aug. 15, 2008

(65) Prior Publication Data
US 2010/0042387 A1  Feb. 18, 2010

(51) Int. Cl.
*G06G 7/48* (2006.01)
(52) U.S. Cl.
USPC .......................................................... 706/6
(58) Field of Classification Search
USPC .......................................................... 703/6
See application file for complete search history.

(56) References Cited

U.S. PATENT DOCUMENTS

| | | | | |
|---|---|---|---|---|
| 2003/0101449 A1* | 5/2003 | Bentolila et al. | ................ | 725/10 |
| 2003/0101451 A1* | 5/2003 | Bentolila et al. | ................ | 725/34 |
| 2005/0091106 A1* | 4/2005 | Reller et al. | .................... | 705/14 |
| 2007/0179867 A1* | 8/2007 | Glazer et al. | .................... | 705/27 |
| 2007/0208730 A1* | 9/2007 | Agichtein et al. | ................ | 707/5 |
| 2008/0249870 A1* | 10/2008 | Angell et al. | .................... | 705/14 |
| 2009/0006286 A1* | 1/2009 | Angell et al. | .................... | 706/12 |
| 2009/0006295 A1* | 1/2009 | Angell et al. | .................... | 706/21 |

* cited by examiner

*Primary Examiner* — Omar Fernandez Rivas
*Assistant Examiner* — Nithya J Moll

(57) ABSTRACT

Disclosed herein are systems, methods, and computer readable-media for contextual adaptive advertising. The method for contextual adaptive advertising comprises tracking user behavior across multiple modalities or devices, storing one or more representations of user behavior in a log as descriptors, normalizing the descriptors, merging the normalized descriptors into a unified click or interactive stream, and generating a behavioral model by analyzing the click or interactive stream.

42 Claims, 2 Drawing Sheets

SYSTEM AND METHOD FOR USER BEHAVIOR MODELING

BACKGROUND OF THE INVENTION

1. Field of the Invention

The present invention relates to user behavior models and more specifically to generating actionable user behavior models based on clickstreams.

2. Introduction

Consumers are viewing and interacting with media in many locations and through many devices. In the last decade numerous media devices and media outlets have been introduced into the market, including Tivo, iPods capable of playing audio and video, PDAs capable of displaying video, Youtube, Slingbox, Netflix rentals and streamed media, etc. These recently introduced devices are in addition to more established media outlets such as broadcast television, brick and mortar movie rental stores, cable television, on-demand movies, etc. These different devices have a variety of features, some overlapping, some not. This distributed content consumption makes it difficult to collect and analyze comprehensive usage data about an individual or a group. A wealth of information is potentially available, but it is distributed in many locations in incompatible formats and in some cases is not even stored. What information is gathered is typically not uniform and not normalized. Providing a customized user experience is difficult for network operators and service providers with a woefully incomplete picture of a user's preferences, habits, and tendencies.

Accordingly, what is needed in the art is an improved way to gather a unified picture of user behavior and actions to provide customized content.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for contextual adaptive advertising by tracking user behavior across multiple modalities or devices, storing one or more representations of user behavior in a log as descriptors, normalizing the descriptors, merging the normalized descriptors into a unified click or interactive stream, and generating a behavioral model by analyzing the click or interactive stream.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
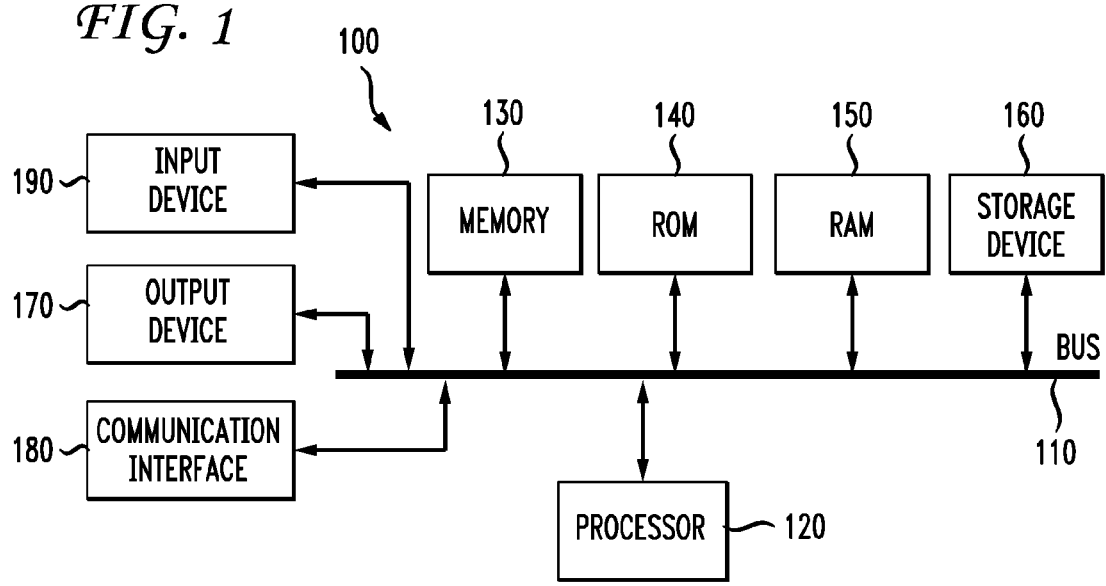
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment. However, tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
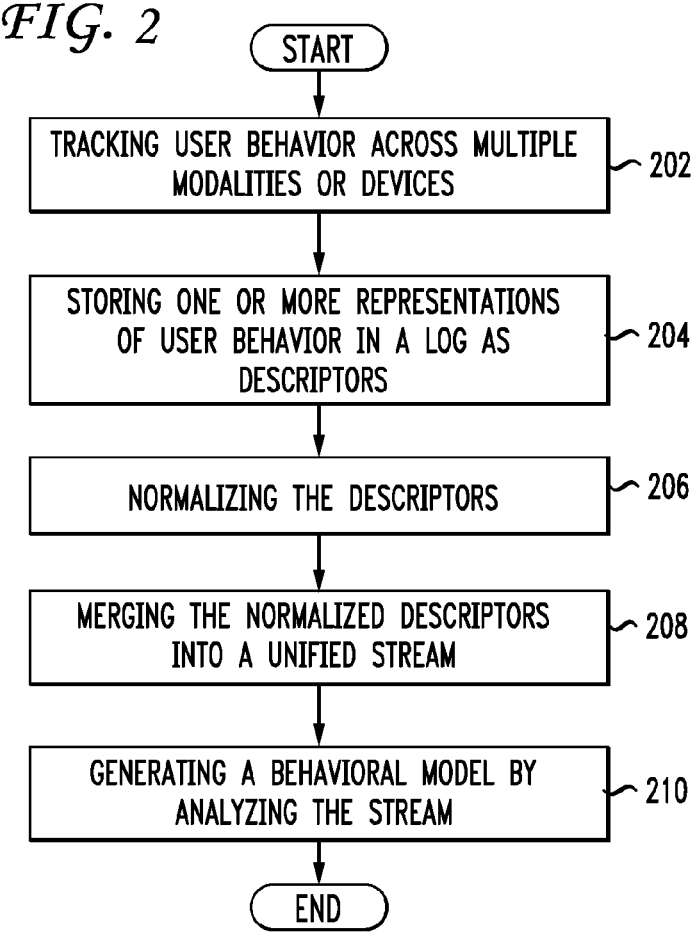
FIG. 2 illustrates a method embodiment for user behavioral modeling.

FIG. 2 illustrates a method embodiment for user behavioral modeling. First, the method tracks user behavior across multiple modalities or devices 202. Television viewing habits, web browsing, phone usage, purchases, etc. are all examples of user behavior. Different devices dictate tracking different types of behavior. Representations of user behavior include video content, audio content, buttons pressed on a remote control or gamepad, clicks on a mouse, gestural or multimodal input, characters typed on a keyboard, IP Multimedia Subsystem traffic, meta-data, haptic input, biometric tracking, and timing, frequency, and location of inputs. For example, user behavior interacting with a web site through a browser may record keystrokes, clicks, duration spent on each individual page, where the mouse hovers in the page, what is highlighted, etc, while user behavior interacting with a cable provider through a set-top box would record things like what channels are watched at which time, what the user chooses to record or skip, what volume the user sets the television at, etc. Each aspect of user behavior is different and is restricted to the limitations of the modality or device that is the conduit for the user behavior.

Tracked user behavior may be filtered or sorted according to relevance. Certain behavior may be so common or so run-of-the-mill that it is unimportant in generating an actionable user behavioral model. Such behavior is noise which can be filtered out or attributed lesser weight when assembling the actionable user behavioral model.

In one aspect, user behavior is gathered in a synthetic or alternative environment. Two examples of a synthetic or alternative environment are Second Life™ by Linden Research and World of Warcraf™ by Blizzard. Although Second Life is a very immersive synthetic environment, more minimal synthetic environments, such as Internet Relay Chat (IRC) chatrooms which only employ real-time text chatting between users or online card game communities with limited, structured interaction options, are also contemplated. User behavior can include chats or interactions with other avatars, events attended, conflicts, actual movement of a synthetic entity within the virtual domain (i.e. where the avatar is located and where the avatar has been), items gathered, game goals, friend lists, commonly visited persons, places, or things, etc. Capturing user behavior in these synthetic or alternative environments is increasingly important for users who spend more time interacting in virtual worlds than in the real world.

In virtual worlds or in the real world, multiple users' behavior can be tracked as a group. Families, roommates, an office, a social fraternity, an enthusiast club, etc. are all examples of collections of individuals who may be commonly tracked as groups. Wherever enough common interests and habits are shared, it may be advantageous to track the group. In one aspect, the group actionable user behavioral model is assigned to the group collectively and may be blended or meshed with individual actionable user behavioral models. Especially with families, a more child-centric group actionable user behavioral model may be active during certain times of day, while an adult-centric group actionable user behavioral model is active in the evening. This could lead to a specific type of cartoon being shown during the after-school hours, while mystery-thriller movies are shown in the evenings after the children are asleep. This is just one approach out of many to blend group and individual actionable user behavioral models.

Second, the method stores one or more representations of user behavior in a log as descriptors 204. The descriptors are records of the user actions. For example, a descriptor may provide a time, date, and HTTP request, or it could be a time, date, and channel change. Essentially, the descriptors act as a pointer, enabling retrieval or recreation of the original action by reference. Descriptors stored in a log are a shorthand way of representing substantially what the user was doing without storing every detail of every second of their interactions with a device. Logs can be stored locally in a device, in a network, or in some combination of both.

Third, the method normalizes the descriptors 206. In one aspect, normalizing the descriptors abstracts a high-level behavioral concept away from the details of a device. As discussed above, descriptors generated by different devices are in different formats and contain different fields of information. Not all the types of information will line up exactly or at all. Normalizing is a statistical analysis of the descriptors in a uniform way. The user experience is reproduced in a semantically coherent way. Normalization results can be stored, if necessary, locally, in a network, or a combination of both. If step 208 is not performed in real time, normalization results can be queued up for future use.

Next, the method merges the normalized descriptors into a unified click input or interactive stream 208. Normalized descriptors aggregated from multiple devices and modalities are merged into a unified, coherent click or interactive stream representing high level behavioral concepts. In one aspect, the method allows a user to alter the descriptors or stream to generate a new behavioral model. This behavior is desirable for persons who may regret certain choices they have made, for example, watching pornography on late night cable, and who wish to remove representations of that behavior from their behavioral model. Another example is a child who watches a violent movie without approval from her parents. The parents can expunge all trace of the violent movie from the descriptors and/or stream so that violent content is not factored into the actionable user behavioral model.

Last, the method generates a behavioral model by analyzing the stream 210. In one aspect, the behavioral model is an actionable user behavioral model. Media presentations such as a web page, a television program, audio playlist, etc. can be modified based on the behavioral model by adding new content, editing existing content, or preventing certain content from being displayed. Another way media presentations can be influenced is by suggestion. The behavioral model can be the basis for recommendations to the user of media that may be interesting to the user. In this way, a contextual most-desired next instantiation is extrapolated by synthesizing or suggesting media content based the behavioral model. Multiple media sources are combined to synthesize completely new media content which takes from the best of each media source.

In the case of a web page, links or advertisements can be modified to provide user-dependent links based on the behavioral model. For example, if a link for more information about honeybees is visited by a child, the link is altered to connect to factmonster.com's article on bees. If it is visited by a teenager, the link is altered to connect to wikipedia.org's article on honeybees. If it is visited by a biology professor, the link is altered to connect to a more in depth article on honeybees. This may be done automatically and silently. It may present the user with an option between the original link and the behavioral model-based link. Similar approaches may be used to dynamically alter advertisements based on the actionable user behavioral model. In addition to altering links or advertisements, the user behavioral model can be used by an internet search engine and its associated search results. Search results are collections of links which may be altered, but search results can be pre-filtered or pre-prioritized based on the actionable user behavioral model. A search engine can offer the user an option to selects whether or not to incorporate the behavioral model into a search. This can be on a global basis, on a per-search basis, or on a limited-time basis such as for 1 hour, 1 day, or 1 week.

In one aspect, the behavioral model is severable, meaning that the user selects which portions of the behavioral model are incorporated into alterations. This is another approach to the resolving the pornography or violent movie situation discussed above. Related to this aspect is another aspect where a user selects a weight to assign the behavioral model in a search algorithm. A user may adjust a sliding scale of weight to use the behavioral model. A combination of a sliding scale and severability may be used as well.

As a behavioral model grows and evolves, certain portions of the model may become old or stale. As a user's preferences, habits, and usage change over time, the behavioral model can be updated by pruning unneeded descriptors. Particularly in the lives of teens and young adults, fads and one-hit wonders occur all the time. As tastes and preferences are refined, old or irrelevant descriptors can be removed and the actionable user behavioral model can be rebuilt.

Figure 3:
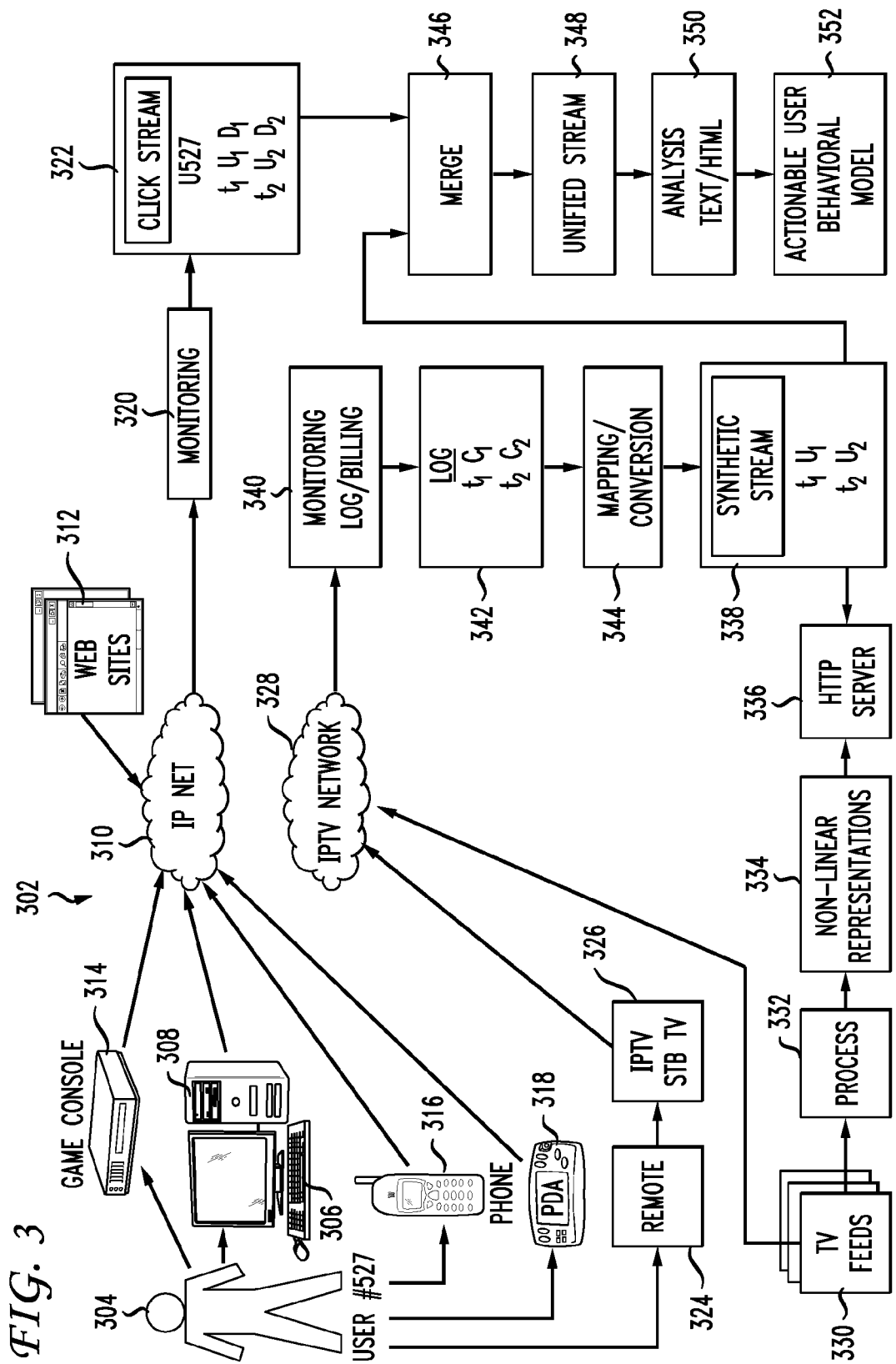
FIG. 3 illustrates an exemplary system embodiment for user behavior modeling.

FIG. 3 illustrates an exemplary system embodiment for user behavior modeling 302. User #527 (304) interacts with various media and devices. The user types on a keyboard 306 connected to a computer 308 connected through an IP network 310 to access web sites 312. The IP network is exemplary and other network types can be easily substituted in its place by one of skill in the art. The network can be wired, wireless, or a combination of both. Likewise, the user can interact with websites or other resources on the IP network via a game console 314, phone 316 or PDA 318. A cellular phone may communicate with an IP Multimedia Subsystem (IMS) in addition to direct access to the IP network. IMS interactions may necessitate different recording mechanisms than interactions with the IP network, but IMS serves the same basic function as the IP network illustrated in this aspect of the system, but can also serve as a link between multiple mobile devices. The IP network communicates with a monitoring unit 320 to record the actions and behavior of the user in a click stream 322. The click stream gathers multiple data points for each action. In the click stream, user identification is recorded and associated with the data points. In the click stream box, T1 is the datestamp of action 1, U1 is the URL of the action, and D1 is the device the action was requested on. An example entry is Feb. 2, 2009 at 2:22:02 p.m. MDT, http://www.att.com/smallbusiness, Apple iPhone. T2, U2, and D2 are shown to illustrate that multiple data points are recorded, one for each recorded action.

Recording user behavior is not limited to web sites. Another example shown is using a remote control 324 to interact with an IPTV set-top box connected to a television 326 and to an IPTV network 328. The IPTV network draws information and channels from TV feeds 330. The TV feeds are processed 332 into non-linear representations 334. These non-linear representations are made available via an http server 336. The non-linear representations are fed into a synthetic click stream 338.

The IPTV network records the user's interactions with the IPTV network in a monitoring log or a billing log 340. An example log records a timestamp and channel of each interaction with the IPTV network. The channel is dependent on the IPTV network and may not be universally recognizable or comprehensible outside the context of the IPTV network. For example, channel 191 may be Spike™ in Nevada, but Spice™ in Texas. Therefore, the mapping or conversion module 344 is used to convert the log 342 into a more universal form, in the synthetic click stream 338. T1 is the timestamp, as discussed above, and U1 is the universal descriptor of the television channel rather than just a channel number which may or may not have meaning outside the IPTV network.

The click stream 322 and the synthetic clickstream 338 are merged 346 into a unified click stream 348. The unified click stream can be stored in one location or distributed across multiple locations. The user may have access to view or change the unified click stream online or as part of a billing statement. In one aspect, the unified click stream is used to recreate the original user interactions with the media for analysis of the text or HTML 350. For example, a website can be retrieved and examined for content based on the information in the unified clickstream, or a Star Trek episode can be retrieved and the content analyzed based on the time and day that the show was viewed originally. Through accessing the original media content, a click stream represents a large volume of information in a concise way. Based on the information analysis of the text and/or the HTML, an actionable user behavioral model is created. The actionable user behavioral model reflects the user's likes and dislikes. It is a uniform, coherent view of the user experience which represents the user experience independent of individual device characteristics. The actionable user behavioral model can have any desired resolution, based on inputs and processing power. Some possible resolutions can be 20 seconds, 1 minute, 1 hour, 1 day or 1 week. A user can specify the temporal resolution or granularity of updates to the actionable user behavioral model. One aspect of the system is a very high initial resolution until a more or less complete actionable user behavioral model is formed, after which the resolution is reduced over time.

As actionable user behavioral models are developed for groups of users, network providers can extrapolate general usage trends and plan and optimize network facilities, content delivery, caching of popular media, etc.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in telephone calls, video conferencing, text messaging, or electronic entrance systems using 2-way communication, etc. Furthermore, whenever the term "click stream" is used, the concept covers any stream of user interaction that may be rendered and analyzed. Therefore, it covers any clicks, voice, graffiti, motion, or any combination of single or multimodal input. Those skilled in the art will readily recognize various modifications and changes that may be made to the present invention without following the example embodiments and applications illustrated and described herein, and without departing from the true spirit and scope of the present invention.

We claim:

1. A method comprising:
    tracking user behavior across multiple modalities for interacting with a device;
    storing representations of the user behavior in a log as descriptors, each descriptor associated with a modality, the descriptors comprising a first descriptor associated with a first modality and a second descriptor associated with a second modality, wherein the first modality and the second modality are distinct modalities;
    normalizing the descriptors, wherein the first descriptor and the second descriptor are normalized based on: (1) the first modality, (2) the second modality, (3) the device, and (4) a format associated with the device, to yield normalized descriptors;
    merging the normalized descriptors into a unified click stream;
    generating a behavioral model by analyzing the unified click stream; and
    upon receiving user input associated with modifying a presentation of search results associated with a search, dynamically modifying the presentation by using the behavioral model to generate the search results.

2. The method of claim 1, wherein normalizing the descriptors comprises abstracting a high-level behavioral concept away from details of a device.

3. The method of claim 1, wherein the log is stored in one of a local storage device, a network, and in a combination of both the local storage device and the network.

4. The method of claim 1, wherein the representations of the user behavior comprises one of video content, audio content, buttons pressed on a remote control, buttons pressed on a gamepad, clicks on a mouse, characters typed on a keyboard, IP Multimedia Subsystem traffic, meta-data, haptic input, biometric tracking, and timing, frequency, and location of inputs.

5. The method of claim 1, wherein the user behavior is filtered according to relevance.

6. The method of claim 1, further comprising:
    extrapolating a contextual most-desired next instantiation by synthesizing and suggesting media content based the behavioral model.

7. The method of claim 1, wherein the user behavior is in a synthetic environment.

8. The method of claim 1, wherein modifying the presentation further comprises one of adding new content, editing existing content, and preventing certain content from being displayed.

9. The method of claim 1, wherein the presentation further comprises a web page modified to provide user-dependent links based on the behavioral model.

10. The method of claim 1, further comprising receiving a user selection indicating which portion of the behavioral model to incorporate into the search.

11. The method of claim 1, further comprising receiving a user selection indicating a weight to assign the behavioral model in a search algorithm.

12. The method of claim 1, further comprising receiving a user selection indicating alteration of one of the descriptors and the click stream to generate a new behavioral model.

13. The method of claim 1, wherein multiple users' behavior is tracked as a group.

14. The method of claim 1, wherein the behavioral model is updated by pruning unneeded descriptors.

15. A system comprising:
a processor; and
a computer-readable storage medium having instructions stored which, when executed by the processor, perform operations comprising:
tracking user behavior across multiple modalities for interacting with a device;
storing representations of the user behavior in a log as descriptors, each descriptor associated with a modality, the descriptors comprising a first descriptor associated with a first modality and a second descriptor associated with a second modality, wherein the first modality and the second modality are distinct modalities;
normalizing the descriptors, wherein the first descriptor and the second descriptor are normalized based on: (1) the first modality, (2) the second modality, (3) the device, and (4) a format associated with the device, to yield normalized descriptors;
merging the normalized descriptors into a unified click stream;
generating a behavioral model by analyzing the unified click stream; and
upon receiving user input associated with modifying a presentation of search results associated with a search, dynamically modifying the presentation by using the behavioral model to generate the search results.

16. The system of claim 15, wherein normalizing the descriptors comprises abstracting a high-level behavioral concept away from details of a device.

17. The system of claim 15, wherein the log is stored in one of a local storage device, a network, and in a combination of both the local storage device and the network.

18. The system of claim 15, wherein the representations of the user behavior comprises one of video content, audio content, buttons pressed on a remote control, buttons pressed on a gamepad, clicks on a mouse, characters typed on a keyboard, IP Multimedia Subsystem traffic, meta-data, haptic input, biometric tracking, and timing, frequency, and location of inputs.

19. The system of claim 15, wherein the user behavior is filtered according to relevance.

20. The system of claim 15, the computer-readable storage medium having additional instructions stored which result in the operations further comprising:
extrapolating a contextual most-desired next instantiation by synthesizing and suggesting media content based the behavioral model.

21. The system of claim 15, wherein the user behavior is in a synthetic environment.

22. The system of claim 15, wherein modifying the presentation further comprises one of adding new content, editing existing content, and preventing certain content from being displayed.

23. The system of claim 15, wherein the presentation further comprises a web page modified to provide user-dependent links based on the behavioral model.

24. The system of claim 15, the computer-readable storage medium having additional instructions stored which result in the operations further comprising receiving a user selection indicating which portion of the behavioral model to incorporate into the search.

25. The system of claim 15, the computer-readable storage medium having additional instructions stored which result in the operations further comprising receiving a user selection indicating a weight to assign the behavioral model in a search algorithm.

26. The system of claim 15, the computer-readable storage medium having additional instructions stored which result in the operations further comprising receiving a user selection indicating alteration of one of the descriptors and the click stream to generate a new behavioral model.

27. The system of claim 15, wherein multiple users' behavior is tracked as a group.

28. The system of claim 15, wherein the behavioral model is updated by pruning unneeded descriptors.

29. A computer-readable storage device having instructions stored which, when executed on a computing device, cause the computing device to perform operations comprising:
tracking user behavior across multiple modalities for interacting with a device;
storing representations of the user behavior in a log as descriptors, each descriptor associated with a modality, the descriptors comprising a first descriptor associated with a first modality and a second descriptor associated with a second modality, wherein the first modality and the second modality are distinct modalities;
normalizing the descriptors, wherein the first descriptor and the second descriptor are normalized based on: (1) the first modality, (2) the second modality, (3) the device, and (4) a format associated with the device, to yield normalized descriptors;
merging the normalized descriptors into a unified click stream;
generating a behavioral model by analyzing the unified click stream; and
upon receiving user input associated with modifying a presentation of search results associated with a search, dynamically modifying the presentation by using the behavioral model to generate the search results.

30. The computer-readable storage device of claim 29, wherein normalizing the descriptors comprises abstracting a high-level behavioral concept away from details of a device.

31. The computer-readable storage device of claim 29, wherein the log is stored in one of a local storage device, a network, and in a combination of both the local storage device and the network.

32. The computer-readable storage device of claim 29, wherein representations of user behavior comprises one of video content, audio content, buttons pressed on a remote control, buttons pressed on a gamepad, clicks on a mouse, characters typed on a keyboard, IP Multimedia Subsystem traffic, meta-data, haptic input, biometric tracking, and timing, frequency, and location of inputs.

33. The computer-readable storage device of claim 29, wherein user behavior is filtered according to relevance.

34. The computer-readable storage device of claim 29, the computer-readable storage device having additional instructions stored which result in the operations further comprising:
extrapolating a contextual most-desired next instantiation by synthesizing and suggesting media content based the behavioral model.

35. The computer-readable storage device of claim 29, wherein the user behavior is in a synthetic environment.

36. The computer-readable storage device of claim 29, wherein modifying the presentation further comprises one of adding new content, editing existing content, and preventing certain content from being displayed.

37. The computer-readable storage device of claim 29, wherein the presentation further comprises a web page modified to provide user-dependent links based on the behavioral model.

38. The computer-readable storage device of claim 29, the computer-readable storage device having additional instructions stored which result in the operations further comprising receiving a user selection indicating which portion of the behavioral model to incorporate into the search.

39. The computer-readable storage device of claim 29, the computer-readable storage device having additional instructions stored which result in the operations further comprising receiving a user selection indicating a weight to assign the behavioral model in a search algorithm.

40. The computer-readable storage device of claim 29, the computer-readable storage device having additional instructions stored which result in the operations further comprising receiving a user selection indicating alteration of one of the descriptors the click stream to generate a new behavioral model.

41. The computer-readable storage device of claim 29, wherein multiple users' behavior is tracked as a group.

42. The computer-readable storage device of claim 29, wherein the behavioral model is updated by pruning unneeded descriptors.

* * * * *